April 24, 1928.
F. G. BREMER
1,667,530
BUMPER STRUCTURE
Filed Dec. 6, 1927
2 Sheets-Sheet 1
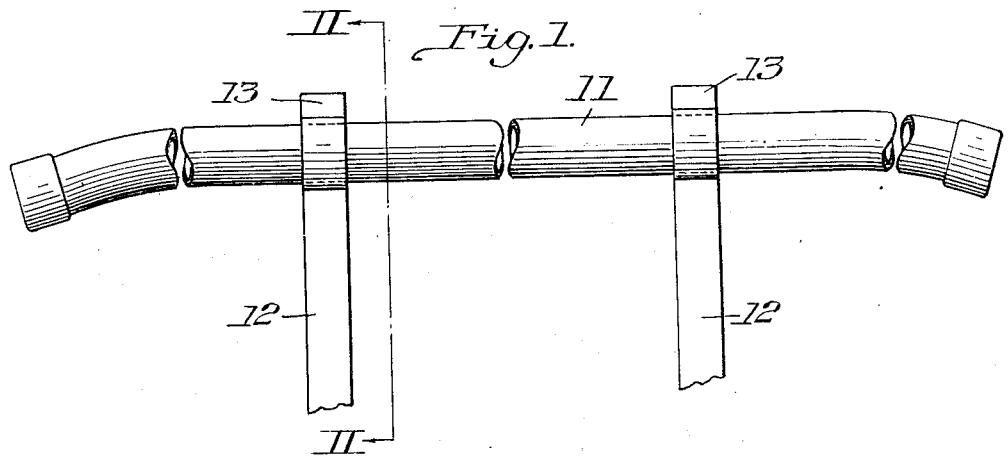
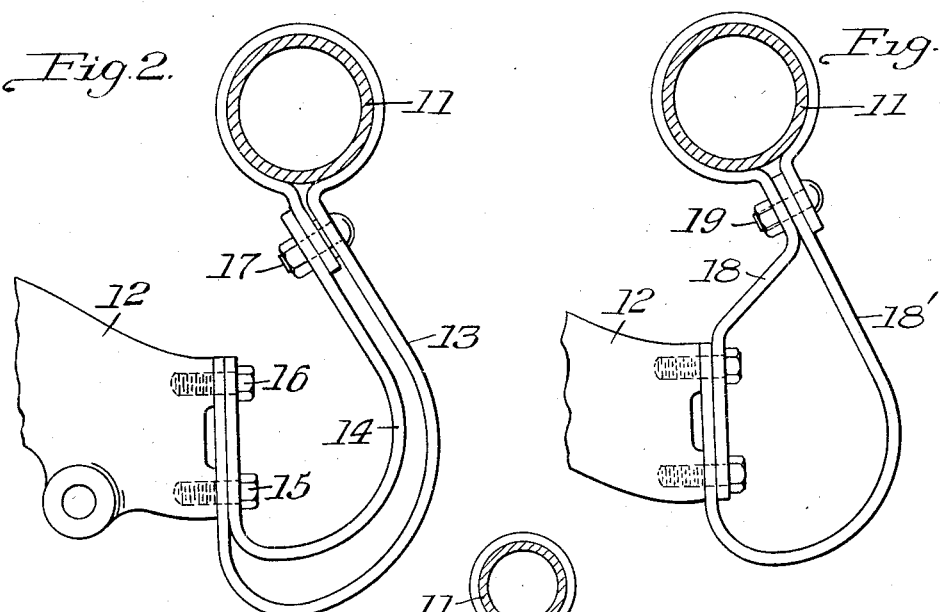

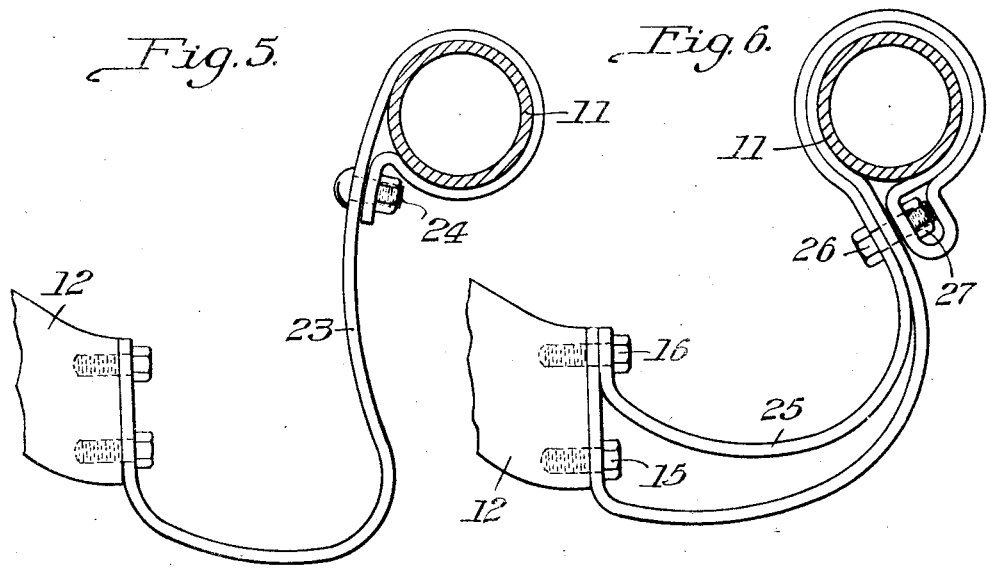
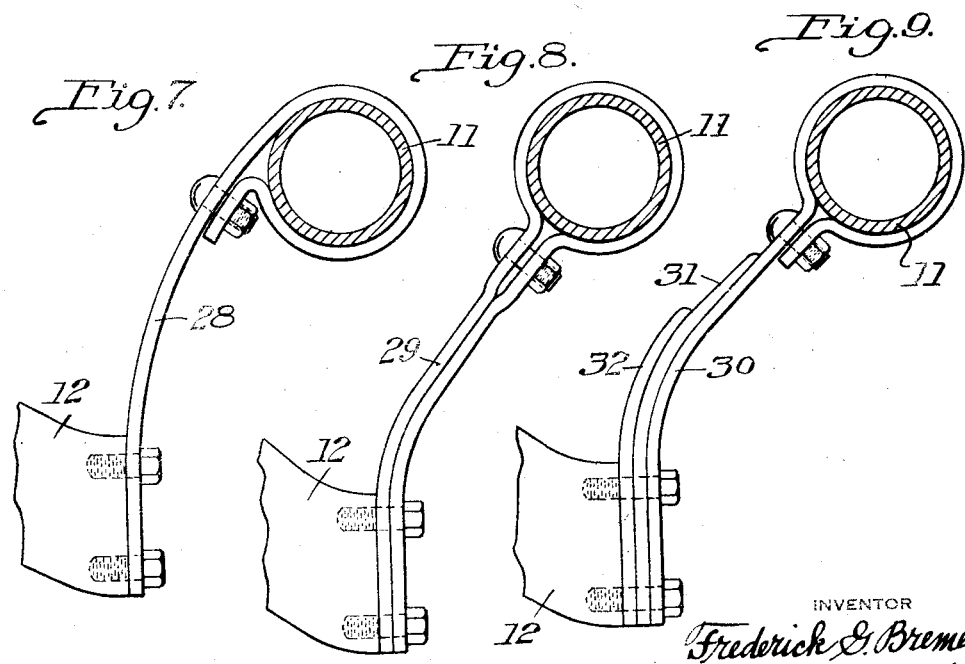

Patented Apr. 24, 1928.

1,667,530

UNITED STATES PATENT OFFICE.

FREDERICK G. BREMER, OF PITTSBURGH, PENNSYLVANIA, ASSIGNOR TO UNITED STATES CHAIN & FORGING COMPANY, OF PITTSBURGH, PENNSYLVANIA, A CORPORATION OF DELAWARE.

BUMPER STRUCTURE.

Application filed December 6, 1927. Serial No. 238,060.

My invention relates to automobile bumper structures such as are employed at the front and rear ends of motor vehicles, for absorbing the force of impacts.

One object of my invention is to provide an improved manner of yieldably supporting impact bars of the rigid type.

Another object of my invention is to provide an improved form of buffer springs for automobile bumpers.

Still another object of my invention is to provide a buffer structure of such form that it can be more conveniently added to a main buffer spring without changing the form of said spring.

Some of the forms which my invention may take are shown in the accompanying drawing, wherein Figure 1 is a fragmentary plan view of a bumper structure connected to the ends of vehicle frame members; Fig. 2 is a view, on an enlarged scale, taken on the line II—II of Fig. 1, and Figs. 3, 4, 5, 6, 7, 8 and 9 are views showing modifications of the buffer spring device of Fig. 2.

Referring more particularly to Figs. 1 and 2, I show a structure wherein an impact-receiving bar 11 is connected to the forward ends of the vehicle frame members 12, through the medium of a buffer spring structure comprising strap-like members 13 of spring steel or the like, bent to the form shown in Fig. 2, and auxiliary spring members 14. The inner ends of the springs 13 and 14 are flattened and secured to the ends of the frame members 12 by means of screws 15 and 16. The outer end portion of each spring 13 is bent to substantially circular form, so that it will serve as a clamping collar for connecting the impact bar 11 to the buffer spring, when the nut on the bolt 17 is tightened. The bolt 17 also serves to connect the outer end of the auxiliary spring 14 to the spring 13 and the bumper bar. It will be seen that the leaf 14 may be employed or not as desired, and that additional strengthening or reinforcing leaves corresponding to the spring 14 can be provided when required. It will further be seen that it is unnecessary to employ a clamping collar or other means of attachment to the impact bar in addition to the bolt 17 and the spring 13.

Fig. 3 shows a structure wherein buffer springs 18 and 18' are bolted at their inner ends to the vehicle frame, the outer end of the spring 18 being curved about the bumper bar and clamped in position thereon by a bolt 19, which may also extend through the outer end of the spring 18' and clamp the same in position. The spring 18' can be considered an auxiliary spring and could be dispensed with, if desired, under conditions wherein the spring 18 is deemed to have requisite strength.

In Fig. 4, I show a buffer spring structure formed of a single strip of material 21 that has its ends flattened and secured to the vehicle frame, the intermediate portions of the spring being curved and its outer portion bent to circular form to serve as a clamping collar for the impact bar when the bolt 22 is tightened. It will be noted that the inner ends of the spring 21 do not overlap, but are secured to the frame in spaced relation. This arrangement permits the upper curved portion of the spring to serve as a yieldable strut for the lower more flexible curved portion thereof.

In Fig. 5, I show a single buffer spring 23 whose inner end is secured to a vehicle frame and whose outer end is curved forwardly and backwardly to embrace a buffer bar. It will be seen that the outer portion of this spring 23 is so formed that the clamping bolt 24 is disposed rearwardly of and below the impact bar, in such manner that it is not readily visible to one standing in front of the car, thus adding to the appearance of the device.

Figure 6 shows a structure wherein a single spring 25 is folded upon itself and bent to substantially the form shown in Fig. 5, the inner ends thereof, however, being spaced apart, so as to produce a bracing effect of the upper inner end portion, similar to that produced by the member 21 of Fig. 4. A clamping bolt 26 is employed, with its co-operating nut 27 disposed within the fold at the outer end of the spring structure.

In Fig. 7 I show a buffer spring 28 that is connected to the impact bar in substantially the same manner as is the spring 23 of Fig. 5. However, this latter form of device extends upwardly and forwardly from the vehicle frame instead of being looped downwardly and then upwardly.

Fig. 8 shows a structure similar to Fig.

7, but wherein the strip 29 is so folded upon itself, that it is double throughout its entire length, for the purpose of providing greater strength.

Fig. 9 shows a spring 30 of substantially the form of the spring 28 of Fig. 7, but the spring 30 is supplemented by additional spring leaves 31 and 32 that lie against the spring 30 and whose inner ends are clamped between the vehicle frame and the inner end of the spring 30.

I claim as my invention:—

1. A buffer spring comprising a yieldable member having its outer portion bent to substantially annular form, a supplementary yieldable member, and means for holding said portion in clamping engagement with an impact bar, and for connecting the said supplementary member thereto, the inner ends of said members being arranged for attachment to a supporting member.

2. A buffer spring comprising a yieldable member having its outer portion bent to substantially annular form, means for holding said portion in clamping engagement with an impact bar, the inner end of said member being arranged for attachment to a supporting member, and a reinforcing spring detachably secured at both ends to said yieldable member.

3. Buffer spring structure comprising a yieldable member having its inner end portion extending in a vertical line for attachment to a frame member and its outer portion bent to annular form, and means holding said annular portion in clamping engagement with an impact bar.

4. Buffer spring structure comprising a yieldable member having its inner end portion extending in a vertical line for attachment to a frame member and its outer portion bent to annular form, a supplementary yielding member, and a common means for holding said outer portion in clamping engagement with a bar and the supplementary member in assembled relation with said buffer spring.

5. Buffer spring structure comprising a yieldable member having its inner end arranged for attachment to a supporting member and its outer end bent to annular form, a supplementary yielding member, and means for detachably connecting said supplementary member to the first-named yieldable member and for holding said yieldable member in clamping engagement with a bumper bar.

6. Buffer spring structure comprising a yieldable member arranged at one end for attachment to a support and at its other end for connection to an impact bar, and means for detachably and rigidly connecting both ends of a supplementary yielding member to the first-named member.

7. Buffer spring structure comprising a yieldable portion having an eye formed therein, a yieldable reinforcing portion, and means for attaching said portions to a support and to an impact bar, the said portions being bent in opposite directions for a portion of their length.

8. Buffer spring structure comprising a yieldable portion having an eye formed in its outer end, means for securing an impact bar to the eye portion, and a second yieldable portion extending from the inner end to the outer end of the first-named portion and detachably but rigidly secured thereto.

9. Buffer spring structure comprising a yieldable portion having an eye formed therein, means for holding an impact bar in said eye, a second yieldable portion, and means for connecting the inner ends of said portions to a support, the second-named portion extending from said connecting means in a direction generally opposite to the direction in which the first-named portion extends therefrom, and having overlapping relation with the outer end of said main portion.

10. Buffer spring structure comprising a yieldable portion having an eye formed therein, means for holding an impact bar in said eye, a second yieldable portion, and means for connecting the inner ends of said portions to a support, the second-named portion extending from said connecting means in a direction generally opposite to the direction in which the first-named portion extends therefrom, and being connected to said bar-holding means.

11. Buffer spring structure comprising a yieldable portion having an eye formed in its outer end, means for holding an impact bar in assembled relation with said eye, a second yieldable portion, means for connecting the inner ends of said portions to a support, and means for connecting the outer ends thereof, one of said portions extending upwardly and outwardly from the point of connection to said support and the other of said portions extending downwardly and upwardly with respect to said point of connection.

In testimony whereof I, the said FREDERICK G. BREMER, have hereunto set my hand.

FREDERICK G. BREMER.